(12) United States Patent
Zait et al.

(10) Patent No.: US 7,447,676 B2
(45) Date of Patent: Nov. 4, 2008

(54) METHOD AND SYSTEM OF COLLECTING EXECUTION STATISTICS OF QUERY STATEMENTS

(75) Inventors: Mohamed Zait, San Jose, CA (US); Ari Mozes, San Carlos, CA (US); Cetin Ozbutun, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 937 days.

(21) Appl. No.: 10/420,475

(22) Filed: Apr. 21, 2003

(65) Prior Publication Data

US 2004/0210563 A1   Oct. 21, 2004

(51) Int. Cl.
*G06F 17/30* (2006.01)
*G06F 15/00* (2006.01)

(52) U.S. Cl. ............................................ 707/3; 712/30
(58) Field of Classification Search ................. 707/1–3, 707/100; 712/30
See application file for complete search history.

(56) References Cited

U.S. PATENT DOCUMENTS

| 5,802,521 | A | 9/1998 | Ziauddin et al. |
|---|---|---|---|
| 5,899,986 | A | 5/1999 | Ziauddin |
| 6,029,163 | A | 2/2000 | Ziauddin |
| 6,263,345 | B1 | 7/2001 | Farrar et al. |
| 6,272,487 | B1 | 8/2001 | Beavin et al. |
| 6,278,989 | B1 | 8/2001 | Chaudhuri et al. |
| 6,353,826 | B1 | 3/2002 | Seputis |
| 6,438,552 | B1 | 8/2002 | Tate |
| 6,460,045 | B1 | 10/2002 | Aboulnaga et al. |
| 6,529,901 | B1 | 3/2003 | Chaudhuri et al. |
| 2003/0120682 | A1* | 6/2003 | Bestgen et al. ........... 707/104.1 |
| 2003/0220941 | A1* | 11/2003 | Arnold et al. ............... 707/200 |
| 2004/0193629 | A1* | 9/2004 | Mozes ........................ 707/100 |
| 2005/0193376 | A1* | 9/2005 | Harrison ..................... 717/127 |

OTHER PUBLICATIONS

"Table Reorganization Identification", IBM Technical Disclosure Bulletin, vol. 34, No. 1, Jun. 1991.
Oracle8 Server Tuning; Release 8; Jun. 1997; Chap. 22; pp. 22-1 to 22-32.

* cited by examiner

*Primary Examiner*—Alford W. Kindred
(74) *Attorney, Agent, or Firm*—Vista IP Law Group LLP (57) ABSTRACT

A method and system of collecting execution statistics of query statements is disclosed. An execution plan is generated for a query statement in one embodiment of the invention. The execution plan includes one or more operations. One of the one or more operations is selected. The selected execution plan is then executed and a plurality of execution statistics of the selected operation is collected.

33 Claims, 8 Drawing Sheets

| Statement ID | Operation ID | Operation Name | # Rows | # Reads | ... | Elapse Time |
|---|---|---|---|---|---|---|
| 10 | 1 | | 1000 | 80 | | 120 |
| 10 | 2 | | 10000 | 200 | | 600 |
| 10 | 3 | | 100 | 20 | | 30 |
| ... | | | | | | |

1102

| Statement ID | Operation ID | Operation Name | Object Name | Estimated # Rows | Estimated # Reads | ... | Estimated Elapse Time |
|---|---|---|---|---|---|---|---|
| 10 | 1 | 1000 | | 100 | 25 | | 50 |
| 10 | 2 | 10000 | | 5000 | 180 | | 450 |
| 10 | 3 | 100 | | 75 | 18 | | 22 |
| ... | | | | | | | |

METHOD AND SYSTEM OF COLLECTING EXECUTION STATISTICS OF QUERY STATEMENTS

BACKGROUND AND SUMMARY

The present invention is related to the field of computer systems. More particularly, the present invention is directed to a method and system of collecting execution statistics of query statements.

Query statements are often used to interrogate and access a database. These query statements are usually expressed using specialized query languages such as Structured Query Language (SQL). A query statement may include the identity of the database object(s) being accessed to execute a query statement (e.g., one or more named database tables). If the query statement accesses two or more database objects, then the query statement may also include the link between the objects (e.g., a join condition or a common column). In addition, the query statement may define a selection criteria, which is often referred to as a matching condition, filter, or predicate. The query statement may further define which fields in the database object are to be displayed or printed in the result.

To execute a query statement, a database system may have to perform operations involving the retrieval or manipulation of data from various database structures, such as tables and indexes. Often, there exists many alternate ways to execute the query statement. For example, a single query statement can be executed in different ways by varying the order in which tables are joined, the implementation of the join operation between two tables, and how data is retrieved from each table to execute the statement. The retrieval operation can be implemented by scanning all data in a table, or by using an index to access a fraction of the table. The join operation can be implemented using a hash-based or a sort-based algorithm. The implementation and order of operations taken to execute the query statement can drastically change the efficiency or speed of execution for the statement. The implementation and order of operations that are used to execute a query statement is referred to as an execution plan.

An optimizer may be used by the database system to choose what is believed to be the most efficient execution plan for the query statement. Selection of the execution plan may be based on costs, i.e., the amount of a given resource or set of resources needed to process the execution plan. Statistics may be used to estimate the costs associated with the execution plan by quantifying the data distribution and/or storage characteristics of data in database structures (e.g., tables, columns, indexes, partitions, etc.). The optimizer may also use statistics formulas to calculate the selectivity of predicates. Selectivity refers to the proportion or fraction of a database object corresponding to a query predicate. The selectivity of query predicates may be taken into account when estimating the cost of a particular access method or when determining the optimal join order.

Although query optimization has greatly improved in recent years, the true efficiency of an execution plan cannot be determined until it has actually been executed. Tools that can collect execution statistics at the query statement level are available to users for verifying whether the execution plan performed as expected. However, when an execution plan does not perform as predicted (e.g., the execution plan consumes more resources than anticipated), knowledge of execution statistics at the query statement level does not allow users to diagnose the source(s) of inefficiency (e.g., which part of the execution plan consumed the most resources) since the collected statistics are directed to the query statement as a whole. Hence, it would not be possible for users to pinpoint the bottleneck(s) in the execution plan.

Some tools are able to collect execution statistics at the operation level. However, the collection of execution statistics at the operation level in those tools is limited to a few operations such as scans and sorts. In addition, the collection mechanism is operation specific and requires modification of the operations themselves. Therefore, the collection mechanism is not easily implemented and cannot be used for other operations. Furthermore, the only generic execution statistic collected at the operation level in those tools is the number of rows produced by the operation. Such information would often be insufficient to determine the cause(s) of the bottleneck(s) in the execution plan (e.g., why a part of the execution plan consumed significantly more resources than other parts of the execution plan).

Moreover, the ability to diagnose the sources and causes of inefficiencies may allow users to fine tune databases to achieve optimal performance. For example, users may be able to tailor a database for a specific query statement. Most of the tools that collect execution statistics dump the collected execution statistics into trace files, which makes it difficult for users to exploit the information for performance tuning analysis as users cannot easily process information in the trace files in conjunction with other database information.

The present invention provides a method and system of collecting execution statistics of query statements. In one embodiment, an execution plan is generated for a query statement. The execution plan includes one or more operations. One of the one or more operations is selected and executed. A plurality of execution statistics of the selected operation is collected.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Collecting execution statistics of query statements at the operation level is disclosed. Rather than only collecting execution statistics at the statement level, statistics for a limited number of operations, or statistics relating to the number of rows produced, which may not be very useful for diagnosing the source(s) and/or cause(s) of inefficiencies in execution plans and/or database systems, a variety of execution statistics may be collected at the operation level for every type of operation. Operation level execution statistics provide invaluable insight into query statements and are therefore essential to improving performance of time-critical applications.

Figure 1:
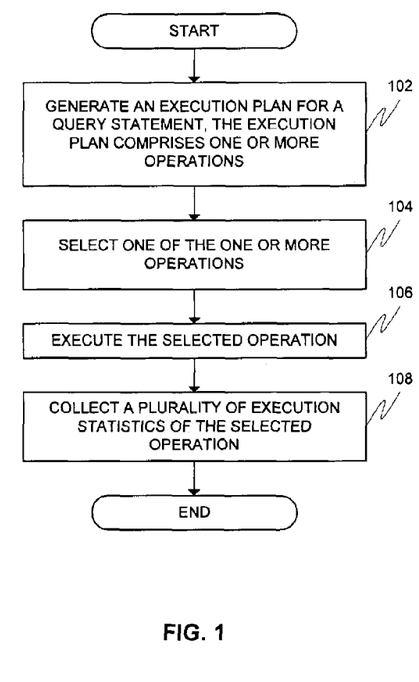
FIG. 1 is a flow chart of a method of collecting execution statistics of query statements according to one embodiment of the invention.

FIG. 1 illustrates one embodiment of a method of collecting execution statistics of query statements. An execution plan is generated for a query statement (102). The execution plan includes one or more operations. One of the one or more operations in the execution plan is selected (104). The selected operation is executed (106) and a plurality of execution statistics of the selected operation is collected (108).

Execution statistics may include, for example, number of rows produced, number of disk reads, number of disk writes, number of buffer gets, elapsed time, and CPU time. Knowledge of execution statistics of operations in an execution plan allows users to pinpoint possible locations of hotspots and/or bottlenecks and to determine the cause of the hotspots and/or bottlenecks.

Figure 2:
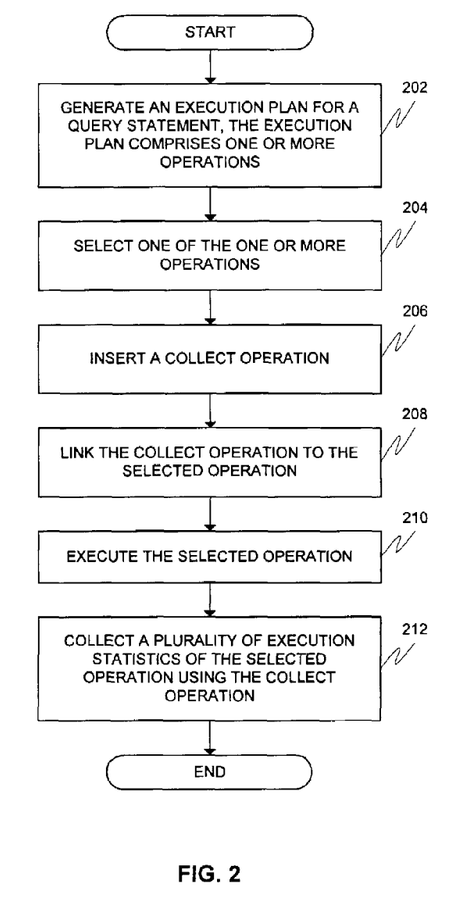
FIG. 2 illustrates a process flow of a method of collecting execution statistics of query statements according to another embodiment of the invention.

Shown in FIG. 2 is another method of collecting execution statistics of query statements. An execution plan is generated for a query statement (202). The execution plan comprises one or more operations. One of the one or more operations in the execution plan is selected (204). A collect operation is inserted (206) and linked to the selected operation (208). The collect operation may be generic, i.e., it can be linked to any type of operation, or it may be operation-specific. The selected operation is executed (210) and a plurality of execution statistics of the selected operation is collected using the collect operation (212).

Figure 3:
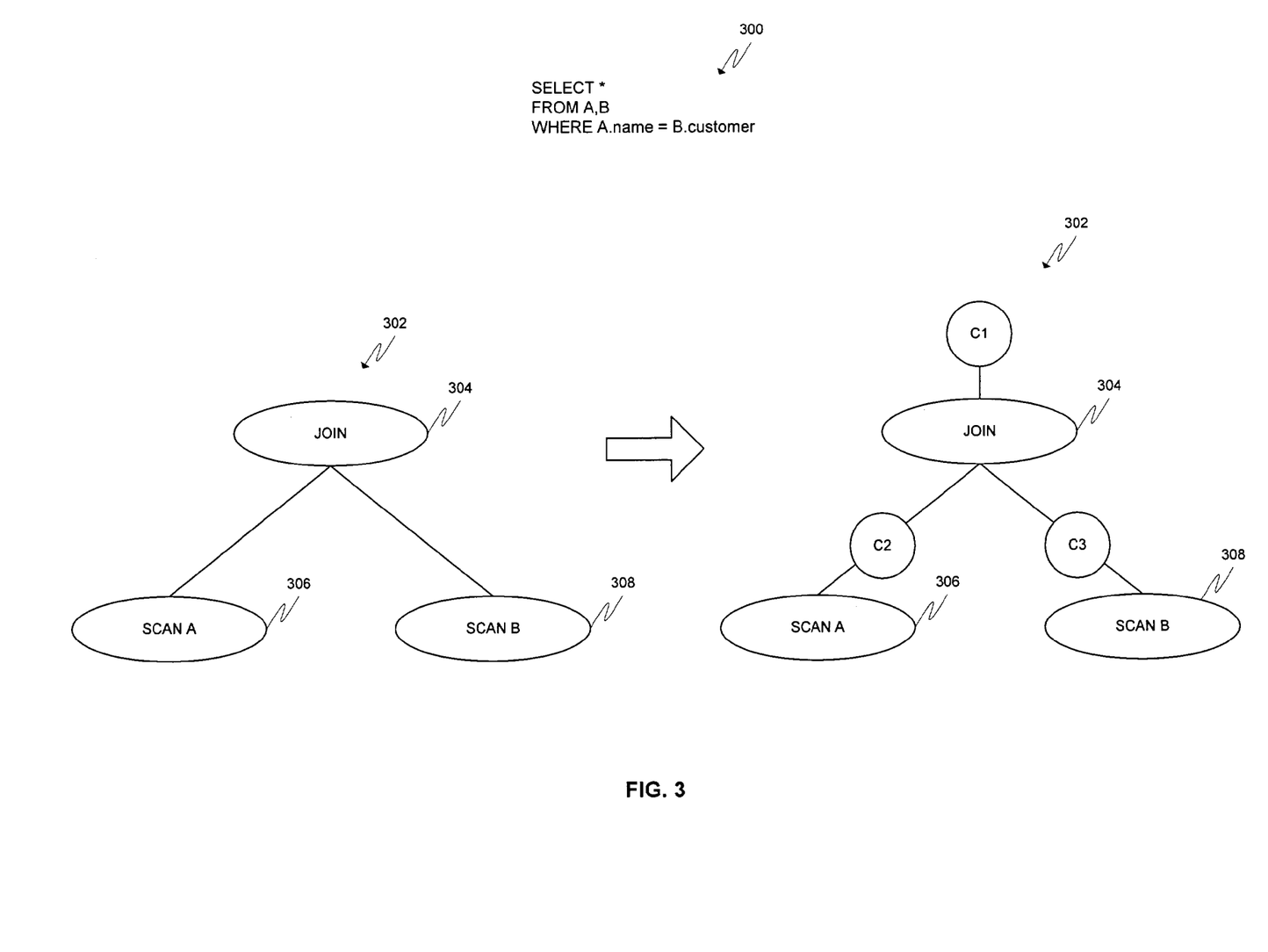
FIG. 3 depicts an example of one embodiment of the invention.

An example of a query statement is depicted in FIG. 3. Query statement 300 is expressed in SQL and seeks to find all records from tables A and B having equal values in the name column in table A and the customer column in table B. An execution plan 302 has been generated for query statement 300. Execution plan 302 comprises three operations—two scan operations 306-308 and one join operation 304. In the example of FIG. 3, three collect operations—C1, C2, and C3—are inserted into execution plan 302 to collect execution statistics of operations 304-308. Collect operation C1 is linked to join operation 304. Collect operations C2 and C3 are linked to scan operations 306 and 308, respectively.

In another embodiment, execution statistics may not be collected for all of the operations in an execution plan. For example, in FIG. 3, execution statistics of only one or two of the operations in execution plan 302 may be collected instead. In a further embodiment, execution statistics that have already been collected may be used to determine the operation(s) in which execution statistics will be collected for. Collected execution statistics may also be used to determine the type(s) of execution statistics that will be collected for those operations. In a still further embodiment, the collection mechanism may be integrated into the underlying operation. For example, in FIG. 3, each of the three operations 304-308 in execution plan 302 may have a built-in mechanism to collect execution statistics.

Figure 4:
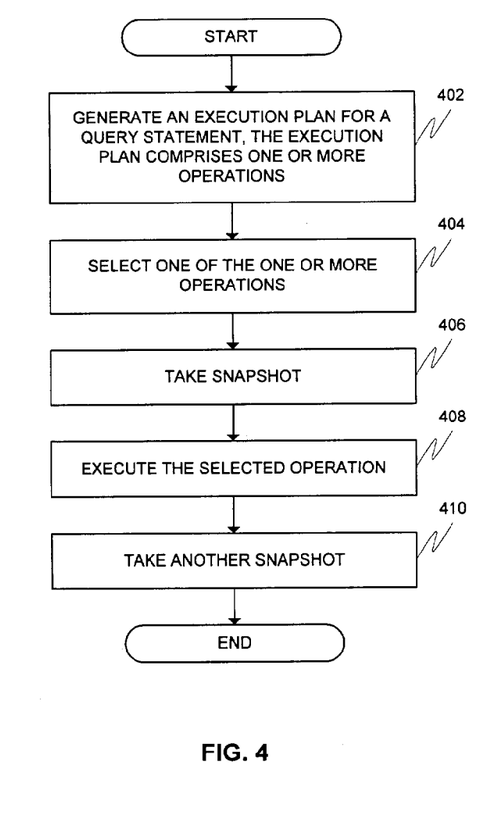
FIG. 4 shows a further embodiment of a method of collecting execution statistics of query statements.

FIG. 4 illustrates a method of collecting execution statistics of query statements according to an embodiment of the invention. An execution plan is generated for a query statement (402). The execution plan comprises one or more operations. One of the one or more operations in the execution plan is selected (404). A snapshot of the database system is taken (406) before the selected operation is executed (408). The snapshot may include information such as the current number of disk reads, the current number of disk writes, the current number of buffer gets, the current CPU time, etc. Another snapshot is taken after execution of the selected operation (410). Execution statistics of the selected operation can then be calculated by comparing the two snapshots, e.g., calculating the differences between the two snapshots.

Figure 5:
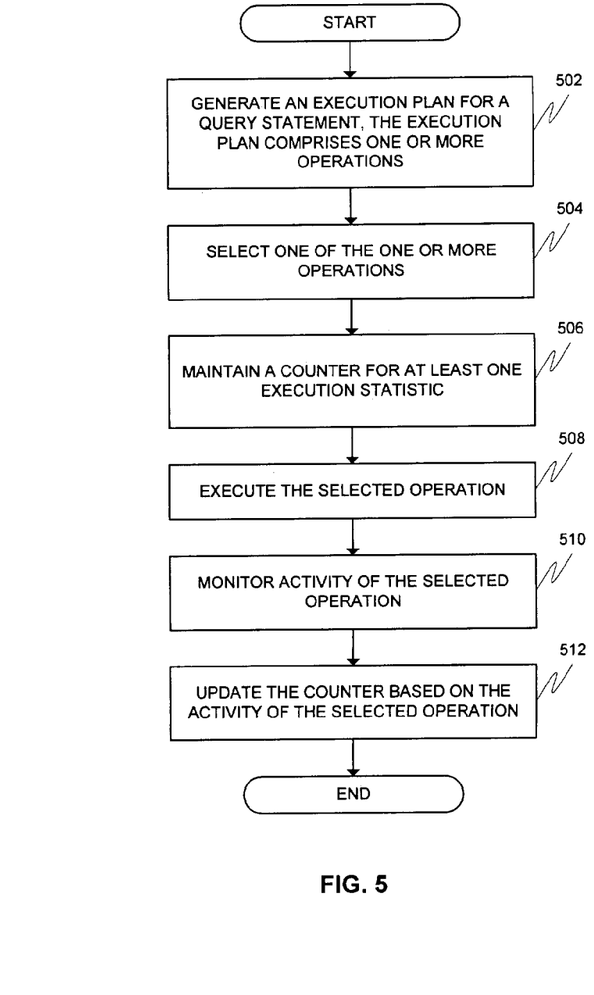
FIG. 5 is a flow chart of a method of collecting execution statistics of query statements according to a still further embodiment of the invention.

Another method of collecting execution statistics of query statements is shown in FIG. 5. An execution plan is generated for a query statement (502). The execution plan includes one or more operations, one of which is selected (504). A counter is maintained for at least one execution statistic (506). For example, a counter may be maintained to track the number of rows produced. The selected operation is executed (508) and the activity of the selected operation is monitored (510). The counter is updated based on the activity of the selected operation (512).

Figure 6:
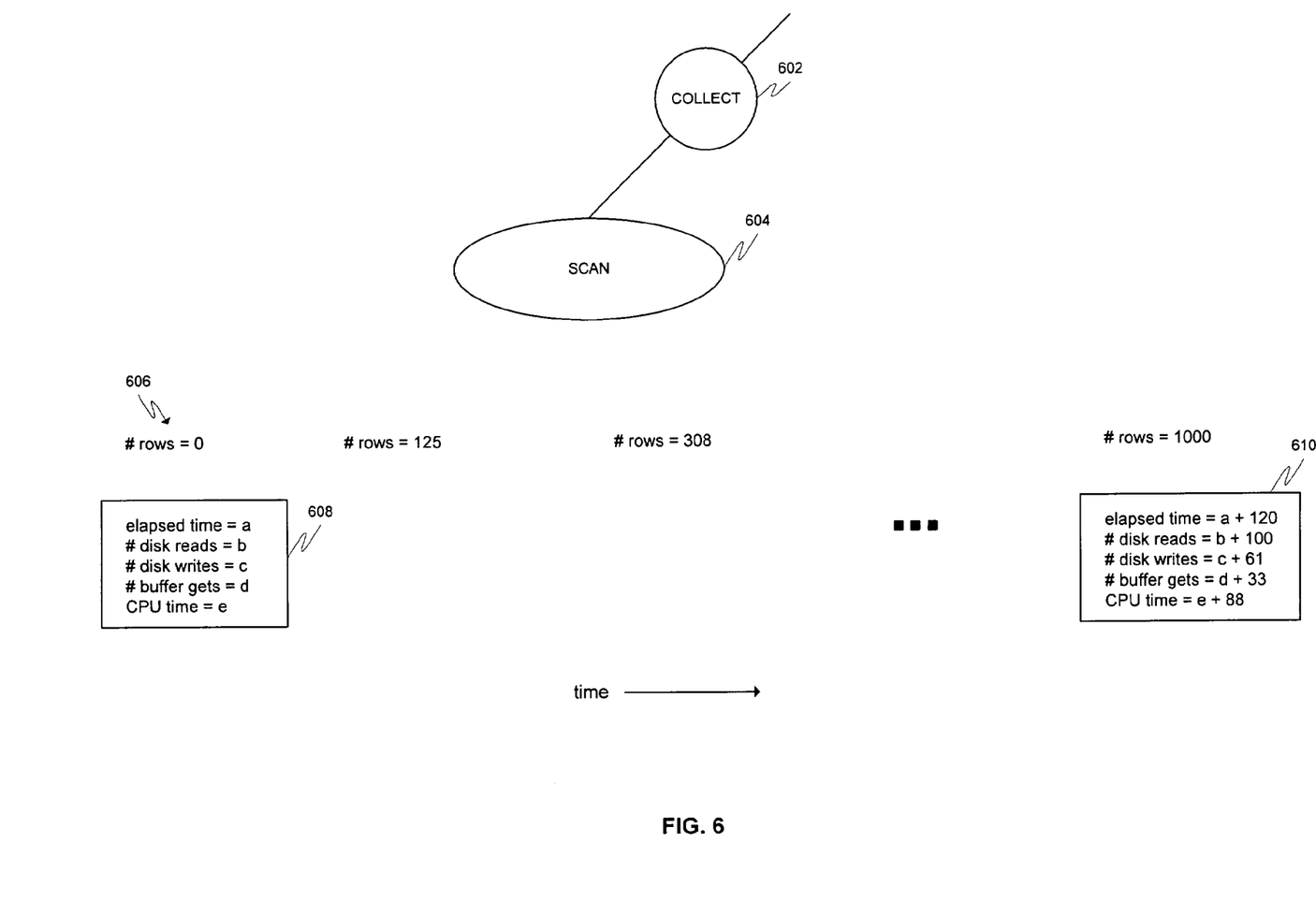
FIG. 6 illustrates an example of another embodiment of the invention.

Depicted in FIG. 6 is a time lapsed example of execution statistics of an operation being collected. In the example, collect operation 602, which is linked to scan operation 604, is collecting execution statistics of scan operation 604. A counter 606 is maintained for the number of rows produced by scan operation 604. A snapshot 608 is taken prior to execution of scan operation 604.

Initially, counter 606 is set to zero. Collect operation 602 monitors the activity of scan operation 604 and updates counter 606 accordingly. For example, as rows are produced by scan operation 604 and pass through collect operation 602, counter 606 is incremented. In one embodiment, collect operation 602 does not constantly monitor scan operation 604, i.e., a sampling of execution statistics is collected. Collect operation 602 may periodically monitor scan operation 604. The periodically collected information is then extrapolated to estimate one or more execution statistics. In another embodiment, as execution statistics are being collected, collect operation 602 may adjust the rate at which execution statistics are being collected based on execution statistics already collected, e.g., by increasing or decreasing the sampling rate.

Another snapshot 610 is taken after the execution of scan operation 604 has concluded. Execution statistics such as the elapsed time, the number of disk reads, the number of disk writes, the number of buffer gets, and the CPU time can then be calculated based on the differences between snapshots 608 and 610.

Figure 7:
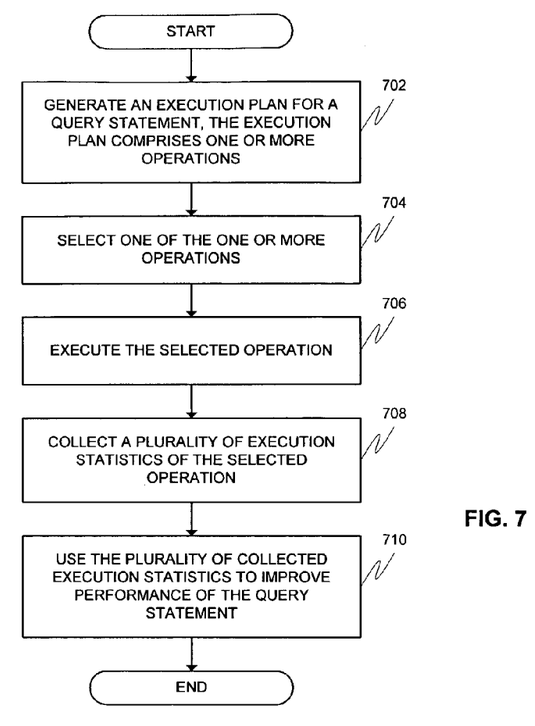
FIG. 7 depicts a process flow of a method of collecting execution statistics of query statements according to one embodiment of the invention.

One method of collecting execution statistics of query statements is depicted in FIG. 7. An execution plan is generated for a query statement (702). The execution plan includes one or more operations. One of the one or more operations in the execution plan is selected (704). The selected operation is executed (706) and a plurality of execution statistics of the selected operation is collected (708). The plurality of collected execution statistics are then used to improve performance of the query statement (710). For example, performance of the query statement can be improved by changing the database design (e.g., adding an index to the database or partitioning a database object), altering the execution plan, rewriting the query statement, changing the configuration of the optimizer, etc.

Figure 8:
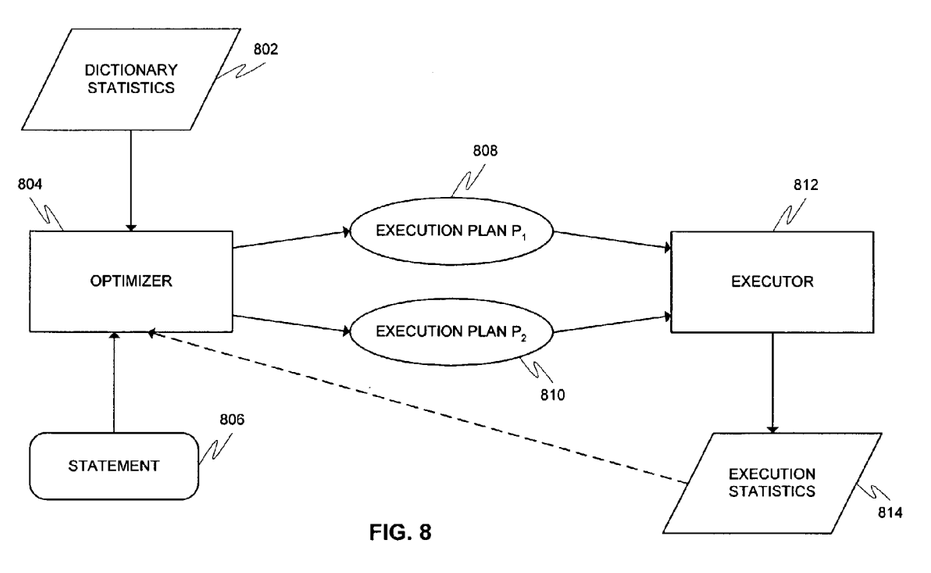
FIG. 8 shows an example of a further embodiment of the invention.

FIG. 8 illustrates an example of how execution statistics are used to improve the performance of a query statement. An optimizer 804 generates an execution plan 808 for a query statement 806 based on dictionary statistics 802. Executor 812 executes execution plan 808 and execution statistics 814 are collected. If execution statistics 814 differ from the optimizer estimates for execution plan 808, then optimizer 804 generates a second execution plan 810 for query statement 806 based on execution statistics 814. In another embodiment, rather than generating a new execution plan, optimizer 804 simply selects another execution plan that was previously generated, but not selected, based on execution statistics 814.

Optimizer 804 may be programmed to automatically use execution statistics 814 to improve performance of query statement 806. Alternatively, whether optimizer 804 uses execution statistics 814 to improve performance of query statement 806 may be determined on a case-by-case basis by a user.

Figure 9:
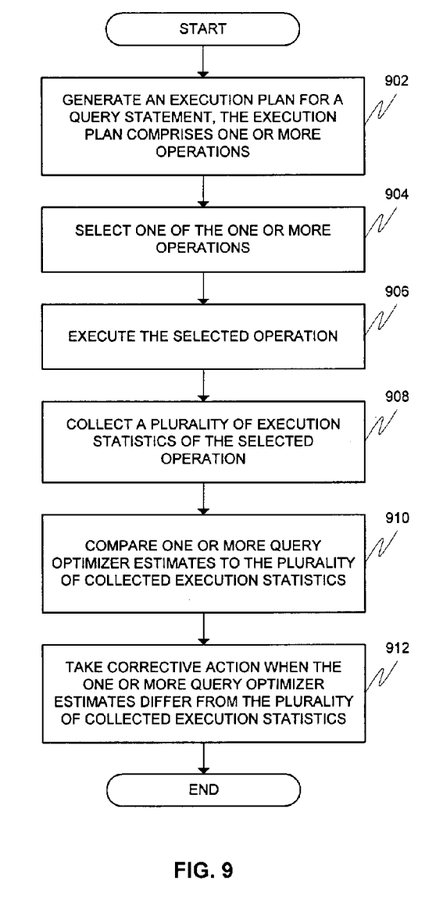
FIG. 9 is another embodiment of a method of collecting execution statistics of query statements.

Another method of collecting execution statistics of query statements is depicted in FIG. 9. An execution plan is generated for a query statement (902). The execution plan comprises one or more operations. One of the one or more operations of the execution plan is selected (904) and then executed (906). A plurality of execution statistics of the selected operation is collected (908). One or more query optimizer estimates are then compared to the plurality of collected execution statistics (910) and corrective action is taken when the one or more query optimizer estimates differ from the plurality of collected execution statistics (912). For example, differences between the query optimizer estimates and the plurality of collected execution statistics may be due to the fact that one or more statistics used by the optimizer are stale and need to be refreshed, the approach of the optimizer needs to be changed or adjusted, or the one or more statistics used by the optimizer are insufficient and additional statistics needs to be collected for the optimizer.

Figure 10:
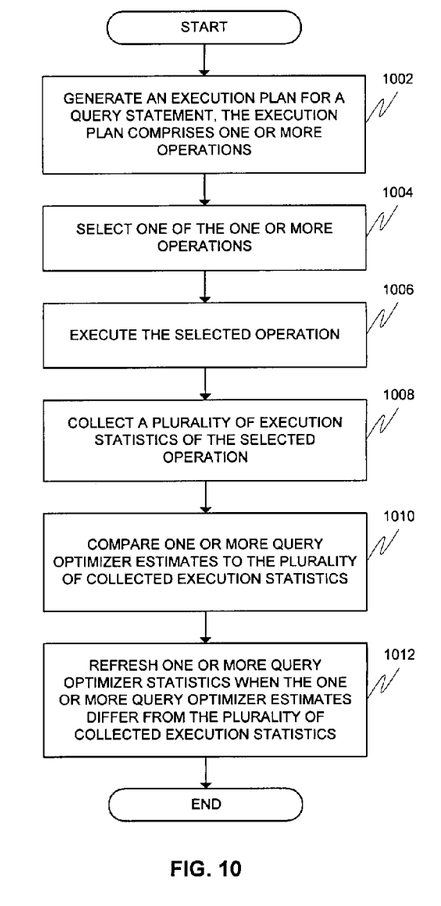
FIG. 10 illustrates a flow chart of a method of collecting execution statistics of query statements according to a further embodiment of the invention.

Shown in FIG. 10 is a further method of collecting execution statistics of query statements. An execution plan for a query statement is generated (1002). The execution plan comprises one or more operations, one of which is selected (1004). The selected operation is then executed (1006) and a plurality of execution statistics of the selected operation are collected (1008). One or more query optimizer estimates are compared to the plurality of collected execution statistics (1010). When the one or more query optimizer estimates differ from the plurality of collected execution statistics, one or more statistics used by the optimizer are refreshed (1012).

Figure 11:
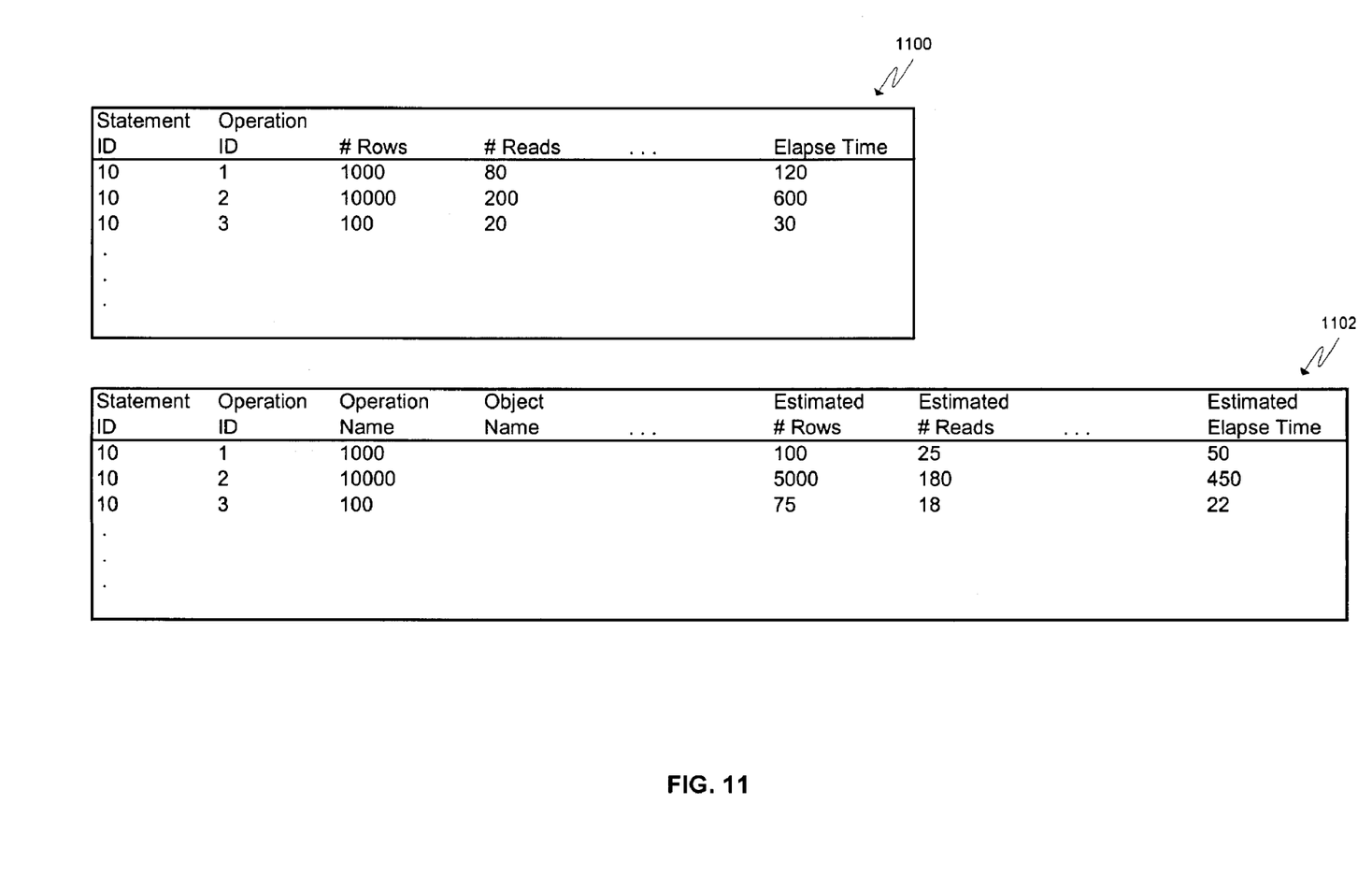
FIG. 11 depicts an example of a still further embodiment of the invention.

In one embodiment, collected execution statistics are available via a dynamic view that can be displayed and manipulated using traditional database query languages. This allows users to issue query statements against the view, which facilitates complex analysis of query statements and database system performance. As illustrated in FIG. 11, execution statistics of a query statement 10 are available via view 1100. Optimizer estimates for query statement 10 are shown in table 1102. Users are then able to issue query statements against view 1100 and table 1102 to compare the execution statistics and the optimizer estimates, locate differences between the execution statistics and the optimizer estimates, etc.

For example, a user may wish to find objects whose database statistics need to be refreshed. The user may issue the following query:

select t.table_name, p.cardinality estCard, s.last_output_rows actCard from
all_tables t,
v$sql_plan p,
v$sql_plan_statistics s
where
p.object_name=t.table_name
and p.hash_value=s.hash_value
and p.child_number=s.child_number
and p.id=s.operation_id
and not (p.cardinality between s.last_output_rows/2 and s.last_output_rows*2)
and t.num_rows<(select inserts+updates+deletes
from all_tab_modifications m
where t.table_name=m.table_name);

The query above seeks to find tables for which the optimizer over or underestimated the cardinality by a factor of two, and on which data manipulation language (DML) statements touched at least as many rows as there were in the table since the last analyze statement was run. The analyze statement may be issued by the user as a corrective action to refresh the statistics used by the optimizer.

The user may also wish to find objects whose access paths need to be revisited, e.g., using an optimizer hint or creating an index. The following query may be issued:

select t.table_name, p.cardinality estCard, s.last_output_rows actCard from
all_tables t,
v$sql_plan p,
v$sql_plan_statistics s
where
p.object_name=t.table_name
and p.hash_value=s.hash_value
and p.child_number=s.child_number
and p.id=s.operation_id
and not (p.cardinality between s.last_output_rows/2 and s.last_output_rows*2)
and t.num_rows <100*s.last_output_rows
and p.operation='TABLE ACCESS'
and p.options='FULL';

The above query seeks to find the tables for which the optimizer over or underestimated the cardinality by a factor of two, the access path is a full table scan, and the produced number of rows is less than one percent of the number of rows produced since the last analyze statement was run. If, for example, a query statement fetched very few rows from the tables, the performance of the query may be improved with the use of an index. The user can take several actions depending on the situation. If an index does not exist, the user may consider creating one based on the columns used in the predicates. If an index does exists and is usable, but the optimizer decided not to use it (e.g., the optimizer thinks it is not cost effective), then the user may experiment running the same query statement using an optimizer hint to force the optimizer to use the index. The user can then decide whether the hint is good or not based on whether there are any improvements in query performance.

If statistics had been collected into trace files, users would not have had the option of using analyze statements similar to those in the two examples above. Hence, having collected execution statistics available via a dynamic view is advantageous for users who wish to analyze query and database system performance.

System Architecture Overview

Figure 12:
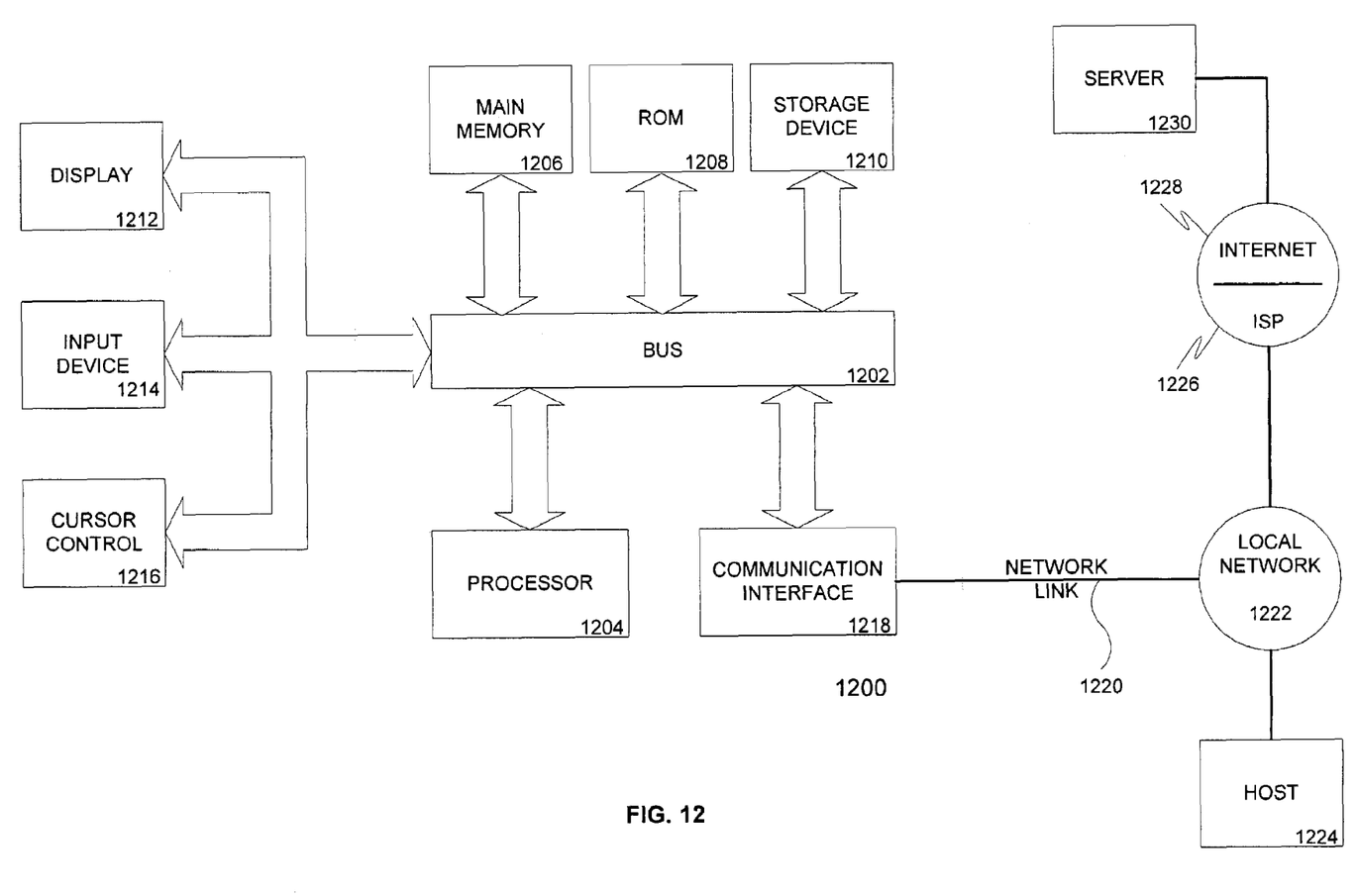
FIG. 12 is a diagram of a computer system with which embodiments of the present invention can be implemented.

FIG. 12 is a block diagram that illustrates a computer system 1200 upon which a method of collecting execution statistics of query statements may be implemented. Computer system 1200 includes a bus 1202 or other communication mechanisms for communicating information, and a processor 1204 couple with bus 1202 for processing information. Computer system 1200 also includes a main memory 1206, such as a random access memory (RAM) or other dynamic storage device, couple to bus 1202 for storing information and instructions to be executed by processor 1204. Main memory 1206 also may be used for storing temporary variables or other intermediate information during execution of instructions to be executed by processor 1204. Computer system 1200 further includes read only memory (ROM) 1208 or other static storage device couple to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

In one embodiment computer system 1200 is used to collect execution statistics of query statements. According to one embodiment, such use is provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In other embodiments, hard-wired circuitry may be used in place of or in combination with software instructions. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application provides for managing, storing, and retrieving data from a storage system containing multiple data storage devices. The received code may be executed by processor 1204 as it is received, and/or stored in storage device 1210, or other non-volatile storage for later execution. In this manner, computer system 1200 may obtain application code in the form of a carrier wave.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of collecting execution statistics of query statements, the method comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein the plurality of execution statistics are selected from the group consisting of number of rows produced, number of disk reads, number of disk writes, number of buffer gets, elapse time, and CPU time.

2. A method of collecting execution statistics of query statements, the method comprising:
   generating an execution plan for a single query statement, the execution plan comprising a plurality of operations;
   selecting a single operation from the plurality of operations;
   executing the selected operation:
   collecting a plurality of execution statistics of the selected operation at the operation level,
   inserting a collect operation; and
   linking the collect operation to the selected operation.

3. The method of claim 2 wherein the plurality of execution statistics are collected using the collect operation.

4. A method of collecting execution statistics of query statements, the method comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein the plurality of collected execution statistics are available via a dynamic view.

5. A method of collecting execution statistics of query statements, the method comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein collecting a plurality of execution statistics comprises:
      taking one snapshot prior to execution of the selected operation; and
      taking another snapshot after execution of the selected operation.

6. The method of claim 5 wherein at least one of the plurality of execution statistics is determined based on differences between the two snapshots.

7. A method of collecting execution statistics of query statements, the method comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein collecting a plurality of execution statistics comprises:
      maintaining a counter for at least one execution statistic;
      monitoring activity of the selected operation; and
      updating the counter based on activity of the selected operation.

8. A computer program product that includes a computer readable medium, the computer readable medium having stored thereon a sequence of instructions which, when executed by a processor, causes the processor to execute a process for collecting execution statistics of query statements, the process comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein the plurality of execution statistics are selected from the group consisting of number of rows produced, number of disk reads, number of disk writes, number of buffer gets, elapse time, and CPU time.

9. A computer program product that includes a computer readable medium, the computer readable medium having stored thereon a sequence of instructions which, when executed by a processor, causes the processor to execute a process for collecting execution statistics of query statements, the process comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein the process further comprises:
      inserting a collect operation; and
      linking the collect operation to the selected operation.

10. The computer program product of claim 9 wherein the plurality of execution statistics are collected using the collect operation.

11. A computer program product that includes a computer readable medium, the computer readable medium having stored thereon a sequence of instructions which, when executed by a processor, causes the processor to execute a process for collecting execution statistics of query statements, the process comprising:
   generating an execution plan for a single query statement, the execution plan comprising a plurality of operations;
   selecting a single operation from the plurality of operations;
   executing the selected operation; and
   collecting a plurality of execution statistics of the selected operation at the operation level,
   wherein the plurality of collected execution statistics are available via a dynamic view.

12. A computer program product that includes a computer readable medium, the computer readable medium having stored thereon a sequence of instructions which, when executed by a processor, causes the processor to execute a process for collecting execution statistics of query statements, the process comprising:

generating an execution plan for a single query statement, the execution plan comprising a plurality of operations;

selecting a single operation from the plurality of operations;

executing the selected operation; and collecting a plurality of execution statistics of the selected operation at the operation level,     wherein collecting a plurality of execution statistics comprises:

taking one snapshot prior to execution of the selected operation; and         taking another snapshot after execution of the selected operation.

13. The computer program product of claim 12 wherein at least one of the plurality of execution statistics is determined based on differences between the two snapshots.

14. A computer program product that includes a computer readable medium, the computer readable medium having stored thereon a sequence of instructions which, when executed by a processor, causes the processor to execute a process for collecting execution statistics of query statements, the process comprising:

generating an execution plan for a single query statement, the execution plan comprising a plurality of operations;

selecting a single operation from the plurality of operations;

executing the selected operation; and collecting a plurality of execution statistics of the selected operation at the operation level,     wherein collecting a plurality of execution statistics comprises:

maintaining a counter for at least one execution statistic;

monitoring activity of the selected operation; and         updating the counter based on activity of the selected operation.

15. A system for collecting execution statistics of query statements, the system comprising:

means for generating an execution plan for a single query statement, the execution plan comprising a plurality of operations;

means for selecting a single operation from the plurality of operations;

means for executing the selected operation; and means for collecting a plurality of execution statistics of the selected operation at the operation level.

16. The system of claim 15 wherein the plurality of execution statistics are selected from the group consisting of number of rows produced, number of disk reads, number of disk writes, number of buffer gets, elapse time, and CPU time.

17. The system of claim 15 further comprising:

means for inserting a collect operation; and means for linking the collect operation to the selected operation.

18. The system of claim 17 wherein the plurality of execution statistics are collected using the collect operation.

19. The system of claim 15 further comprising means for using the plurality of collected execution statistics to improve performance of the query statement.

20. The system of claim 19 wherein performance is improved by changing the execution plan.

21. The system of claim 19 wherein performance is improved by changing database design.

22. The system of claim 15 wherein the plurality of collected execution statistics are available via a dynamic view.

23. The system of claim 15 wherein means for collecting a plurality of execution statistics comprises:

means for taking one snapshot prior to execution of the selected operation; and     means for taking another snapshot after execution of the selected operation.

24. The system of claim 23 wherein at least one of the plurality of execution statistics is determined based on differences between the two snapshots.

25. The system of claim 15 wherein means for collecting a plurality of execution statistics comprises:

means for maintaining a counter for at least one execution statistic;

means for monitoring activity of the selected operation; and     means for updating the counter based on activity of the selected operation.

26. The method of claim 1, 2, 4, 5 or 7 further comprising using the plurality of collected execution statistics to improve performance.

27. The method of claim 26 wherein performance is improved by changing the execution plan.

28. The method of claim 26 wherein performance is improved by changing database design.

29. The method of claim 28 wherein changing database design comprises adding an index to the database.

30. The method of claim 28 wherein changing database design comprises partitioning the database.

31. The computer program product of claim 8, 9, 11, 12 or 14, wherein the process further comprises using the plurality of collected execution statistics to improve performance.

32. The computer program product of claim 31 wherein performance is improved by changing the execution plan.

33. The computer program product of claim 31 wherein performance is improved by changing database design.

* * * * *